(12) United States Patent
Kraus

(10) Patent No.: US 6,510,988 B1
(45) Date of Patent: Jan. 28, 2003

(54) IDENTIFICATION BRACELET

(76) Inventor: Eric M. Kraus, 308 St. Lauren Dr., Greensboro, NC (US) 27410

( * ) Notice: Subject to any disclaimer, the term of this patent is extended or adjusted under 35 U.S.C. 154(b) by 0 days.

(21) Appl. No.: 09/854,276

(22) Filed: May 11, 2001

(51) Int. Cl.$^7$ .................................................. G06K 7/01
(52) U.S. Cl. ........................ 235/382; 235/375; 235/380
(58) Field of Search ................................. 235/375, 382, 235/380; 705/28

(56) References Cited

U.S. PATENT DOCUMENTS

| | | | |
|---|---|---|---|
| 143,668 A | 10/1873 | Clark | |
| 2,186,089 A | 1/1940 | Baker | 224/4 |
| 2,473,226 A | 6/1949 | Sheldon | 224/28 |
| 2,903,774 A | 9/1959 | Harley | 24/170 |
| 3,402,808 A | 9/1968 | Yannuzzi | 206/42 |
| 3,452,402 A | 7/1969 | Prym et al. | 24/75 |
| 3,805,427 A | 4/1974 | Epstein | 40/21 |
| 3,924,304 A | 12/1975 | Grandmont | 24/163 |
| 4,121,360 A | 10/1978 | Vlerebome | 40/586 |
| 4,154,011 A | 5/1979 | Rakestraw et al. | 40/21 |
| 4,226,036 A | 10/1980 | Krug | 40/21 |
| 4,581,271 A | 4/1986 | Gordon | 428/67 |
| 4,650,219 A | 3/1987 | Sigman | 283/70 |
| 4,956,931 A * | 9/1990 | Selke | 40/633 |
| 5,002,212 A | 3/1991 | Charleton | 224/221 |
| 5,092,067 A | 3/1992 | Prout | 40/633 |
| 5,292,017 A | 3/1994 | Reifrs | 215/206 |
| D349,864 S | 8/1994 | Dunlap et al. | D11/3 |
| 5,410,780 A | 5/1995 | Silagy | 24/168 |
| 5,499,468 A * | 3/1996 | Henry | 40/633 |
| 5,555,496 A | 9/1996 | Tackbary et al. | 364/401 |
| 5,577,395 A | 11/1996 | Kuykendall | 63/3 |
| 5,581,924 A | 12/1996 | Peterson | 40/633 |
| 5,615,504 A * | 4/1997 | Peterson et al. | 40/633 |
| 5,629,981 A * | 5/1997 | Nerlikar | 380/25 |
| 5,678,283 A | 10/1997 | Zierer | 24/368 |
| 5,765,705 A | 6/1998 | Deubel | 215/216 |
| 5,799,426 A | 9/1998 | Peterson | 40/633 |
| 5,877,742 A | 3/1999 | Klink | 345/221 |
| 5,883,576 A * | 3/1999 | De La Huerga | 340/573.1 |
| 5,936,530 A | 8/1999 | Meinhold | 340/573.1 |
| 5,940,004 A | 8/1999 | Fulton | 340/825.49 |
| 5,960,085 A * | 9/1999 | de la Huerga | 380/25 |
| 5,960,412 A | 9/1999 | Tackbary et al. | 705/27 |
| 5,966,226 A * | 10/1999 | Gerber | 359/159 |
| 6,000,160 A | 12/1999 | Riley | 40/633 |
| 6,031,460 A | 2/2000 | Banks | 340/573 |
| 6,081,597 A | 6/2000 | Hoffstein et al. | 380/28 |
| 6,092,054 A | 7/2000 | Tackbary et al. | 705/27 |
| 6,173,514 B1 * | 1/2001 | Peterson | 40/1.5 |
| 6,283,065 B1 * | 9/2001 | Shorrock et al. | 119/863 |
| 6,305,329 B1 * | 10/2001 | Levy, Jr. | 119/858 |

OTHER PUBLICATIONS

Copy of newspaper article from the New York Times, "Something to Watch Over Me"; Jul. 6, 2000.
Copy of newspaper article from the New York Times, Chip on the Wrist Helps Parents Keep Tabs on Children; Jul. 6, 2000.
Copy of article form C10 Magazine, "Baby, Don't Leave Me" Feb. 15, 2001.

* cited by examiner

*Primary Examiner*—Michael G. Lee
*Assistant Examiner*—Ahshik Kim
(74) *Attorney, Agent, or Firm*—MacCord Mason PLLC

(57) ABSTRACT

A system of identification for persons having special needs. The system includes an identification tag having a unique identifier for a wearer and a wearer resistant squeeze-and-turn buckle for associating the tag with the wearer having special needs. In the preferred embodiment, the system also includes a computerized system for identifying the persons having special needs.

150 Claims, 7 Drawing Sheets

IDENTIFICATION BRACELET

BACKGROUND OF THE INVENTION (1) Field of the Invention

The present invention relates generally to a system of identification for persons having special needs that includes an identification tag having a unique identifier for the wearer and a means for associating the tag with the special needs wearer and, more particularly, to a system of identification that includes a computerized system to identify persons having special needs.

(2) Description of the Prior Art

Within the general population, there are people who wear some type of identification to assist others in understanding some of their special needs. Within this group are persons with special needs such as those with mental infirmities who are unable to identify themselves either verbally or in writing or communicate to others information about themselves. Included within this group are, for example, pre-verbal children, preschool and some school age children, children and adults with syndromes such as Down Syndrome, adults with neurologic conditions such as Alzheimer disease, and the like. The identification known in the art is worn by these persons to assist in identifying themselves, in particular, in situations where they might become lost or disoriented.

Various identification systems have been tried. The simplest system being, for example, a label or tag that is tied or sewn to the clothing of the person with their pertinent information listed on the label or tag. Other systems include, for example, identification bands that are used in hospitals for patients. Additional systems might be, for example, identification tags such as those used in the military. Although these systems appear to be adequate for certain intended purposes, they do suffer in numerous ways.

For example, many times the identification tag may cause an irritation on the wearer's skin and, thus, the wearer may find a way to remove it. To address this situation, permanent tags have been developed; however, these tags do not allow for the placement and removal of the tag by, for example, a guardian. Along these lines, when a mechanism is included with the tagging system that allows the guardian the ability to put on and remove the tag as appropriate, the wearer also has access to removing the tag. In certain situations, the tag is removed by the wearer, thus defeating the purpose of the identification system. Heretofore, where the identification systems are wearer resistant, removal destroys the tag. Yet another shortcoming of these systems is that they are not aesthetically pleasing. Existing systems also may require a key or special tool to unlock or remove the tag. A system's lack of aesthetics makes the wearer stand out so that they may be susceptible to con artists and the like, which is undesirable. Another feature of these tags is their institutionalized appearance. They are not accommodating of an aesthetic value that is beneficial for the wearer and that might allow the wearer to develop some ownership in the tag, therefore reducing the tendency for the wearer to want to remove the tag.

Other problems with existing systems include the comfort and safety levels thereof especially for persons with special needs and mental infirmities. For example, some systems may include electronic types of devices and therefore would require a pill-sized battery, which can be hazardous to the wearer if the wearer swallows it, or the system is exposed to water or other fluids. In addition, some of the tags that are institutionalized, such as hospital tags and dog tags, do not clearly distinguish the need of the wearer in a way that the general population recognizes the wearer as a special needs person without placing them at risk of harm.

Another aspect of current identification systems is that they may be cumbersome in reuniting a wearer and a guardian. In one case, a tag with all of the wearer and contact information makes the wearer susceptible to manipulation by unscrupulous individuals. To address this, systems have been developed where anonymity of the wearer is maintained. However, to help the wearer return to the respective guardian, systems have been developed that bring the guardian back in contact with the wearer; however, these systems are not easily accessible and may require the availability of local receiving towers which become unavailable once the wearer travels outside the local area served by the receiving tower. Further, these systems are not universally known by authorities such as police, hospitals and other care providers.

Thus, there remains a need for a new and improved system of identification for persons having special needs which provides an identification tag having a unique identifier for the wearer and a system of identification that includes a computerized system to identify persons having special needs while, at the same time, includes a novel wearer resistant means for associating the tag with the special needs wearer.

SUMMARY OF THE INVENTION

The present invention is directed to a system of identification for persons having special needs. The system includes an identification tag having a unique identifier for a wearer and a means for associating the tag with the wearer having special needs. The means for associating the tag comprises a wearer resistant squeeze-and-turn buckle employing a two handed application and removal design, where the buckle is formed as a cylindrical body having a cross-bar, an upper flange, and a support means. Thus, the buckle associates the tag with the wearer.

The system of identification may further include a computerized system for identifying persons having special needs. Desirably, the computerized system is Internet-based and includes multiple types of communication, which may include a human interface that is optionally continuously accessible. The system is capable of providing links to other organizations such as agencies, law enforcement authorities, governmental authorities, schools and hospitals. Further, the system may be accessible by electronic mail and is continuously upgradeable and customizable by the individual subscribers.

The system may also have a means for restricting access to one or more of the types of communication; for example, access may be restricted to a governmental agency. Access may be restricted to persons finding the individual with special needs to limited contact information and may require unique access codes. These unique access codes may further be categorized as geographical or regional. Governmental agency access includes access to extended information that may be contact, personal, or medical information about the person with special needs.

The identification tag of the present system is non-hazardous to the identification wearer either when worn or when removed. For example, the identification tag is so-dimensioned that a person having special needs cannot swallow the identification tag, and the tag is non-conductive when removed from the identification system. The tag is designed to be easily locatable and radio-opaque. The identification tag further includes a latching means, including tabs. Desirably, the system includes a manipulator having a round portion, a recessed portion, and a detent. The detent further includes a chamber that contains a unique identification. The chamber may contain contact information.

The system of identification may be so formed as to further include identification unique to a plurality of wearers. It may be brandable to include colors, a logo, an emblem or a combination thereof.

The means for associating the tag comprises a wearer resistant squeeze-and-turn buckle, where the buckle is formed as a cylindrical body having a cross-bar, an upper flange, and a support means. The cross-bar has opposed flanges that are beveled and interlocking. Desirably, the opposed flanges are capable of overlapping and include strap guides that are up to about 18 mm wide. The opposing flanges provide an attachment means for attaching one end of a strap. The upper flange has a locking groove that includes tab guides and is omni-directional. Further, the upper flange is substantially peripheral. The support means includes multiple wedges formed as opposed pairs having frictional ends. The substantially cylindrical body of the buckle is resilient and further includes a strap that is continuously adjustable, cut-resistant, hydrophobic, durable, strong and flexible. The strap may also be brandable and may include indicia. The strap may further include a loop. The cross-bar with opposing flanges serves as an attachment means for the loop end of the strap. The unattached end of the strap may then be threaded through the buckle in a tortuous path manner. The frictional ends of the support means, the geometry of the tortuous path taken by the strap, and the detent of the identification tag serve as a system to maintain the position of the strap within the buckle as determined by the wearer's guardian. Thus, the strap is maintained in the proper degree of tightness.

Accordingly, one aspect of the present invention is to provide a system of identification for persons having special needs. The system includes an identification tag including a unique identifier for the wearer, and a means for associating the tag with the wearer having special needs.

Another aspect of the present invention is to provide, in a system of identification for persons having special needs, the identification system including an identification tag having a unique identifier for a wearer and a means for associating the identification tag with the identification wearer having special needs, the identification means for associating the identification tag comprising: a wearer resistant squeeze-and-turn buckle for associating the identification tag with the identification wearer having special needs.

Still another aspect of the present invention is to provide a system of identification for persons having special needs, the system including an identification tag having a unique identifier for a wearer and a means for associating the tag with the wearer having special needs. The means for associating the tag include a wearer resistant squeeze-and-turn buckle formed as a substantially cylindrical body having a cross-bar, an upper flange, and a support means, wherein the buckle associates the tag with the wearer having special needs.

These and other aspects of the present invention will become apparent to those skilled in the art after a reading of the following description of the preferred embodiment when considered with the drawings.

DESCRIPTION OF THE PREFERRED EMBODIMENTS

Figure 1:
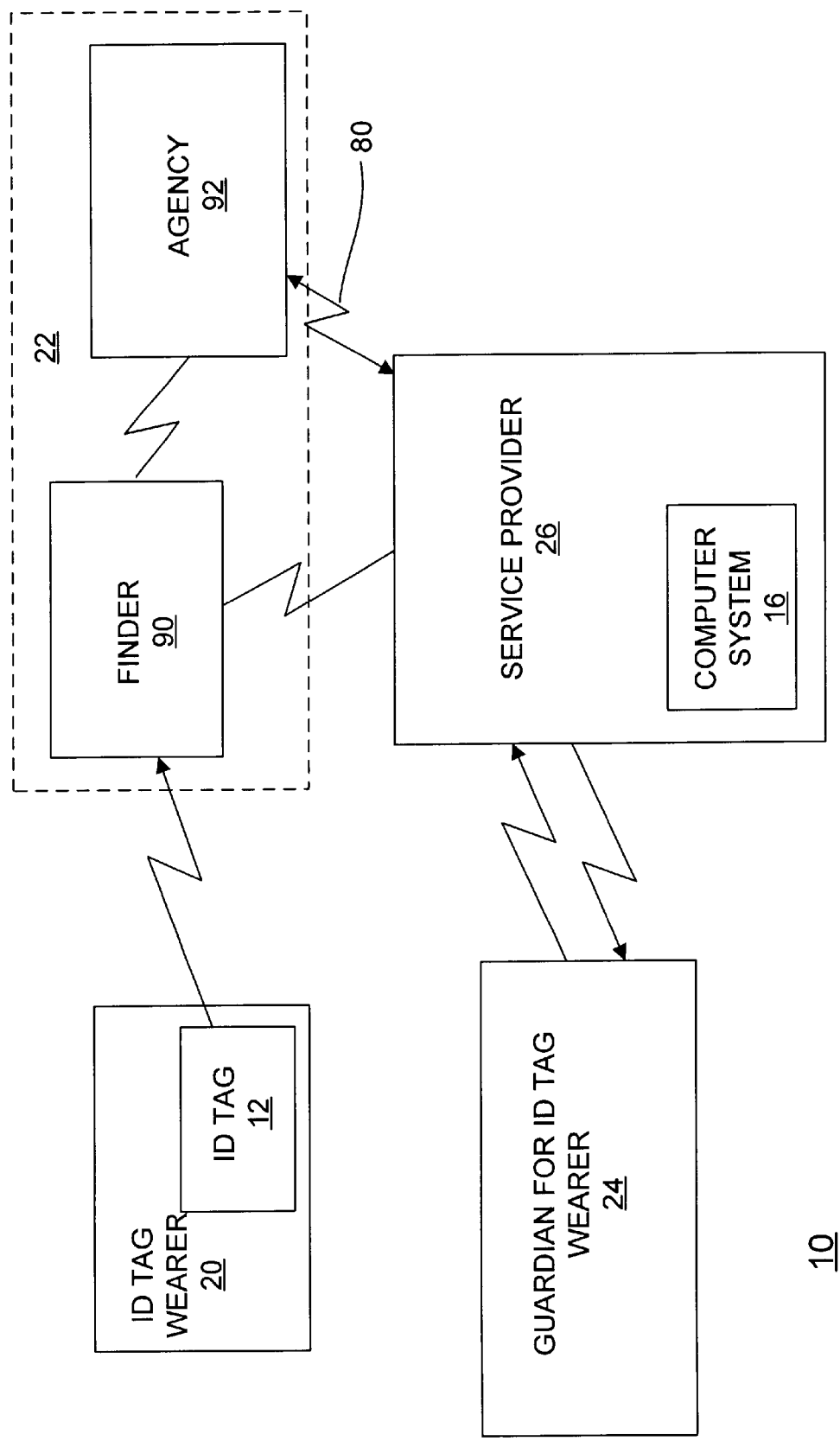
FIG. 1 depicts a system of identification according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

FIG. 1 depicts an identification system according to the present invention including an identification tag wearer 20 wearing an identification tag 12, a guardian 24 for the identification tag wearer 20, and a service provider 26. The service provider 26 possesses a computer system 16. In the broadest terms, the identification system may work in the following manner. A guardian 24 for identification tag wearer 20 subscribes to the service provider 26 for an identification tag 12. The record of the identification tag 12 is created in the computer system 16. The service provider 26 provides the identification tag 12, which is associated with the identification tag wearer 20. As the guardian 24 and the identification tag wearer 20 go about, they make every effort to remain associated. For those situations where the guardian 24 and the identification tag wearer 20 become separated, a third party finder 22 may find the identification tag wearer 20. Upon review of the identification tag 12, the third party finder 22 contacts the service provider 26. Interestingly, at least two types of third party finders 22 might be identified. One is a finder 90 and the other is an agency 92. In the case where the finder 90 finds identification tag wearer 20, he will be directed to the service provider 26. The service provider 26 will review the computer system 16 and make the guardian 24 aware of the location of identification tag wearer 20. One advantage of using an identification tag 12 rather than other means of identification is that the means used to identify identification wearer 20 does not reveal the name and address of the wearer, but uses a specific identification code which service provider 26 uses to identify identification wearer 20 and contact his respective guardian 24. In another scenario, either the identification tag wearer 20 is directed to the agency 92 through finder 90 or makes direct contact with the agency 92. In such a situation, the agency 92 may have information that can help identify identification tag wearer 20. Through a communication link 80, agency 92 can communicate with the service provider 26 and possibly the computer system 16 to find the contact information for identification tag wearer 20 and make the guardian 24 aware of identification tag wearer's 20 location.

Figure 2:
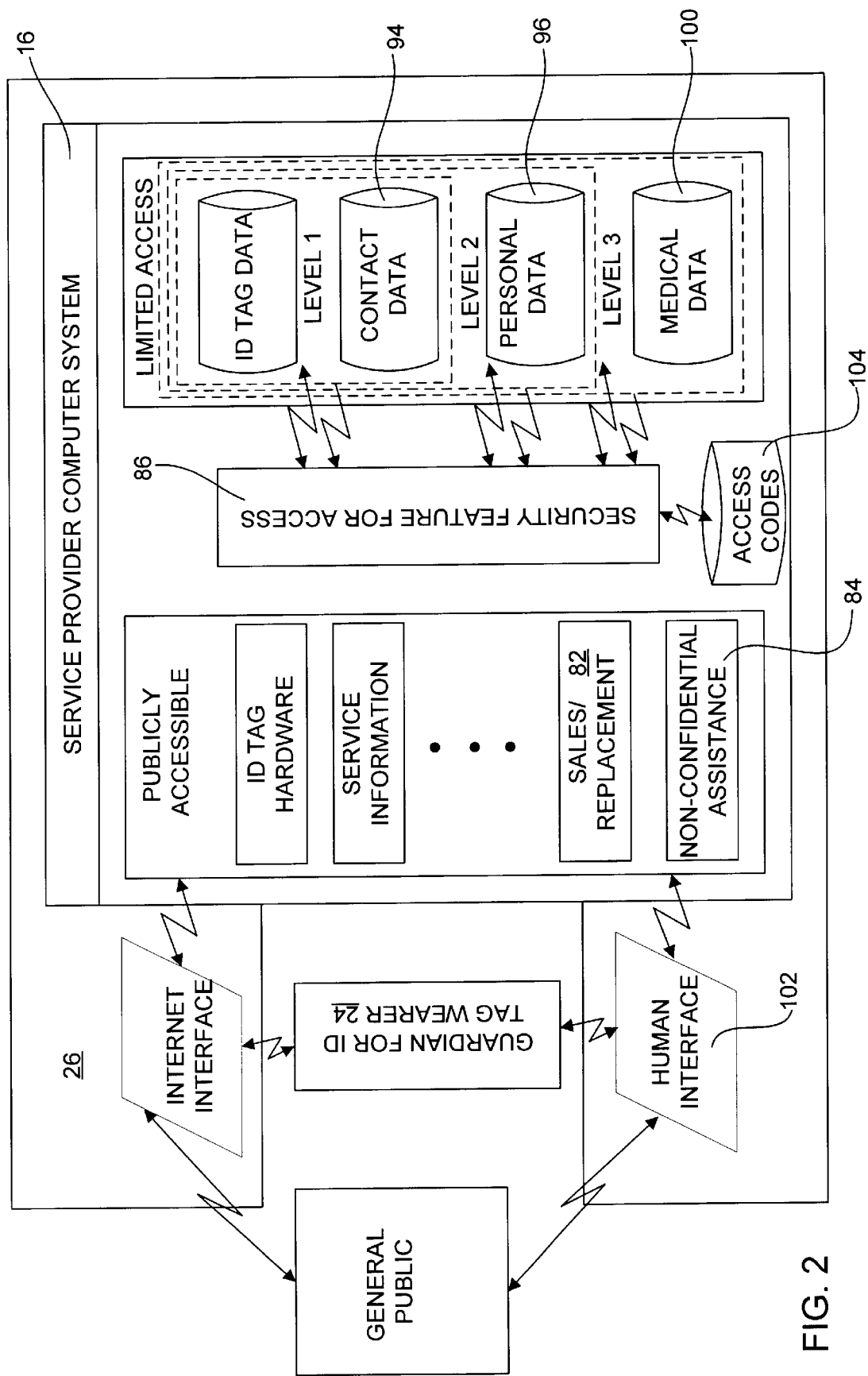
FIG. 2 depicts details of the service provider and service provider computer system of FIG. 1 according to the present invention.

FIG. 2 shows further details of the service provider 26 and aspects of the service provider's computer system 16. In the broadest sense, the service provider 26 would make the services available to the general public in a way that is convenient for their method of communication. One method that the general public might use to communicate with the service provider 26 is through an Internet interface. In this case, the general public could access computer system 16. Within this publicly accessible system, there would be information or advertisements concerning the identification tag hardware including the identification tag 12, and various associating means and aesthetic options that might be available. Also, within this publicly accessible area sales and replacement information would be available. They might also be able to receive non-confidential technical assistance and service information. This area would also give the general public the ability to subscribe to the service provider 26 for the identification tag system and to choose a level of service, change or update data, and provide upgradeable information concerning how to locate guardian 24.

Alternatively, those that either do not feel comfortable using an Internet interface or that do not have access to the Internet interface may work through a human interface 102. This could be done through, for example, traditional methods of using telephone, mail, or even a distributor set up in a kiosk in malls or shopping areas. In the same way that the Internet interface allows patrons access to the public information available on the computer system 16, human interface 102 could do the same. Human interface 102 could also be a means to allow one to apply to be a guardian 24 for an identification tag wearer 20. At this point, certain steps would be taken to maintain the confidentiality and integrity of the guardian 24 and the information that they provide with respect to the identification tag wearer 20, the identification tag data, the contact information, the personal data, and the medical data.

For example, there could be a registration phase that allows the guardian 24 to first register with the service provider 26 in a way to identify himself as a guardian. Upon registration, the service provider 26 would assign a unique identification tag number, place the guardian and wearer's identification information in a limited access area and then send the identification tag, buckle, software, hardware and instructions to the guardian 24. In addition, for each identification tag issued there could be generated a unique pair of public and private identification keys that would allow the guardian 24 to register and update the wearer's identification data and to access certain security levels of the computer system 16.

Thus, once a guardian 24 is transitioned from being a person of the general public to a guardian 24 through their public and private key identification, they may bridge the security feature for access 86 to get to the limited access area of the computer system 16. The guardian 24 may wish to have different levels of subscription to the service, and through these different levels of subscription may have different types of records in the limited access area. For example, at Level 1 the guardian 24 would have data for the wearer's 20 as well as the contact data 94 for the guardian 24. At a higher level of subscription, Level 2, the guardian 24 may provide personal data 96 concerning the wearer that allows authorities to have information that could assist them in finding an identification tag wearer 20 who may have gotten lost. At a Level 3 subscription, the guardian 24 may further include medical data 100 pertaining to identification tag wearer 20.

Through the public/private key combination, guardian 24 would be able to continuously update information, depending upon the subscription level, the contact information 94, personal data 96 and medical data 100 of identification tag wearer 20. Likewise, the security feature for access is beneficial when involving authorities including police, hospitals, schools and the like. In this way, the rights that such authorities might have to the limited access area might be again limited to, for example, Level 1 after the security feature has verified that they have access to the system or any other pertinent data. In any case, the access that would be provided to the authorities would be "read only" in that it would be unnecessary for them to have the ability to change the records within various portions of the database.

The service provider 26 would make information available in a way that communication is most convenient for authorities or the finder of identification tag wearer 20. Because certain guardians 24 wish to maintain or have concerns about privacy, the features of the identification tag 12 would be such as to maintain the identification tag wearer's 20 privacy. Additionally, the service provider 26 makes himself available to the general public in a way that is most convenient for them to communicate with him. As shown in FIG. 2, two of the contemplated features include: 1) an Internet interface 26, or 2) a human interface 102 such as through a telephone number or the like.

Unique to this system is an identification tag and associated wearer which (1) clearly communicates its purpose to unfamiliar parties such as agencies, law enforcement agencies, schools, hospitals, and the like, who may be seeking identification of wearer 20 if wearer 20 becomes lost from guardian 24; (2) is independent of the location of wearer 20; (3) maintains privacy and security, (4) is easy to apply and remove without special tools; (5) is safe and non-hazardous to the wearer; and (6) is customizable by the guardian.

Figure 3A:
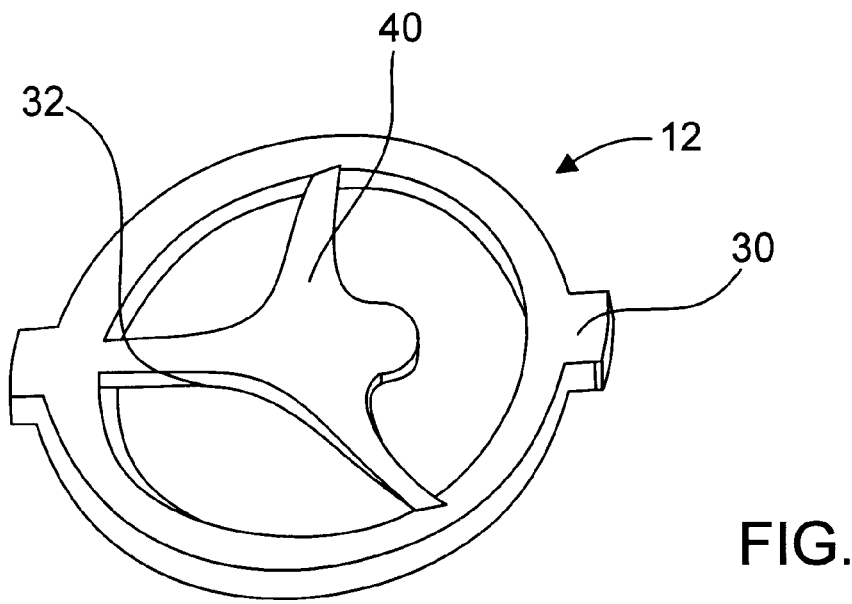
FIGS. 3A and 3B depict the identification tag of the system of identification according to the present invention.
Figure 3B:
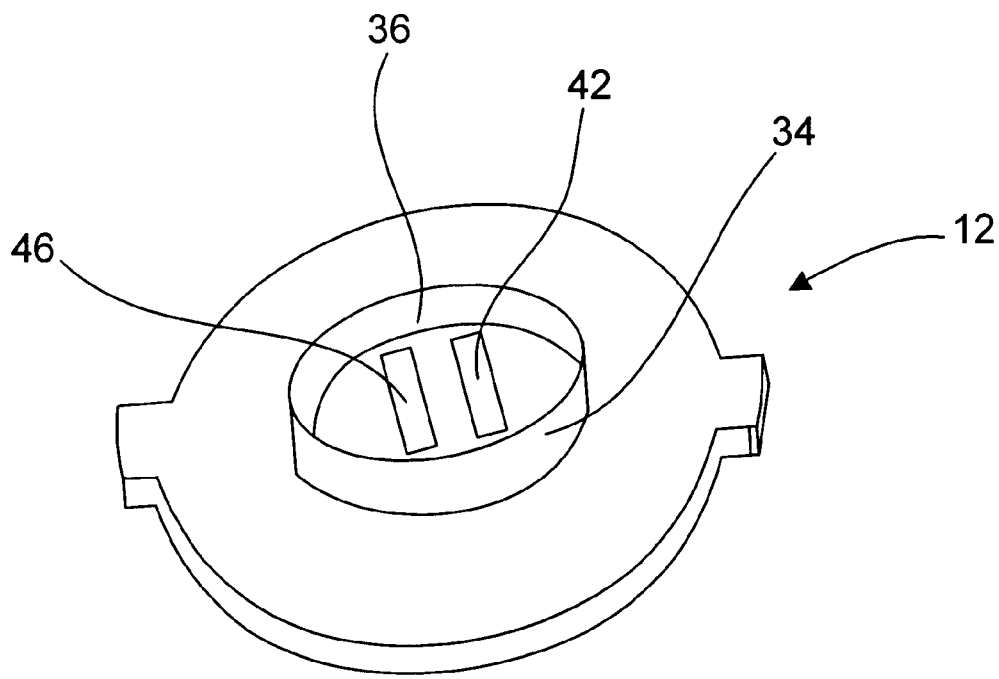
Figure 4A:
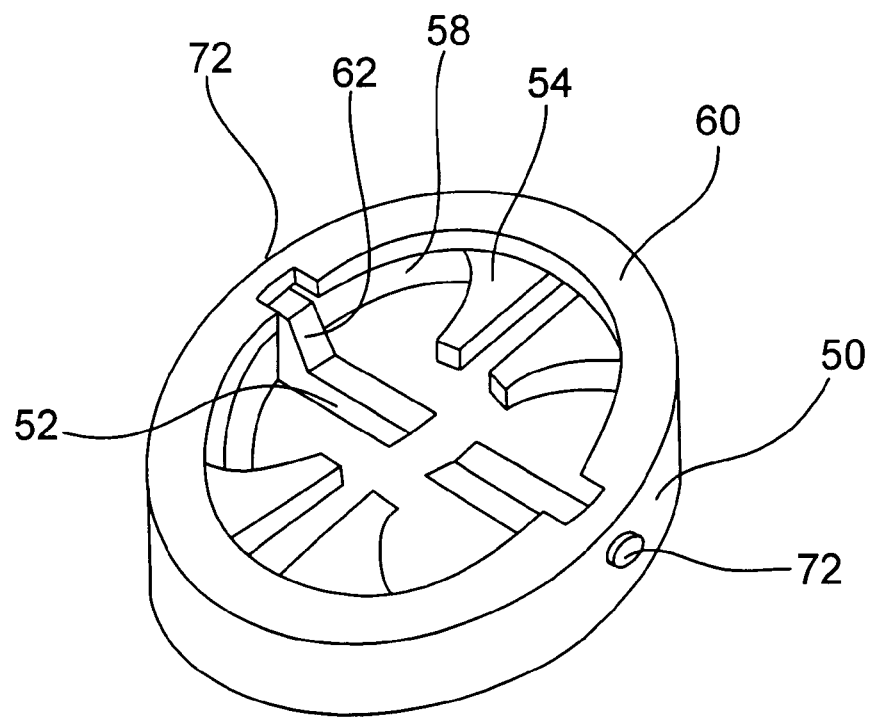
FIGS. 4A and 4B depict the means for associating an identification tag according to the present invention.
Figure 4B:
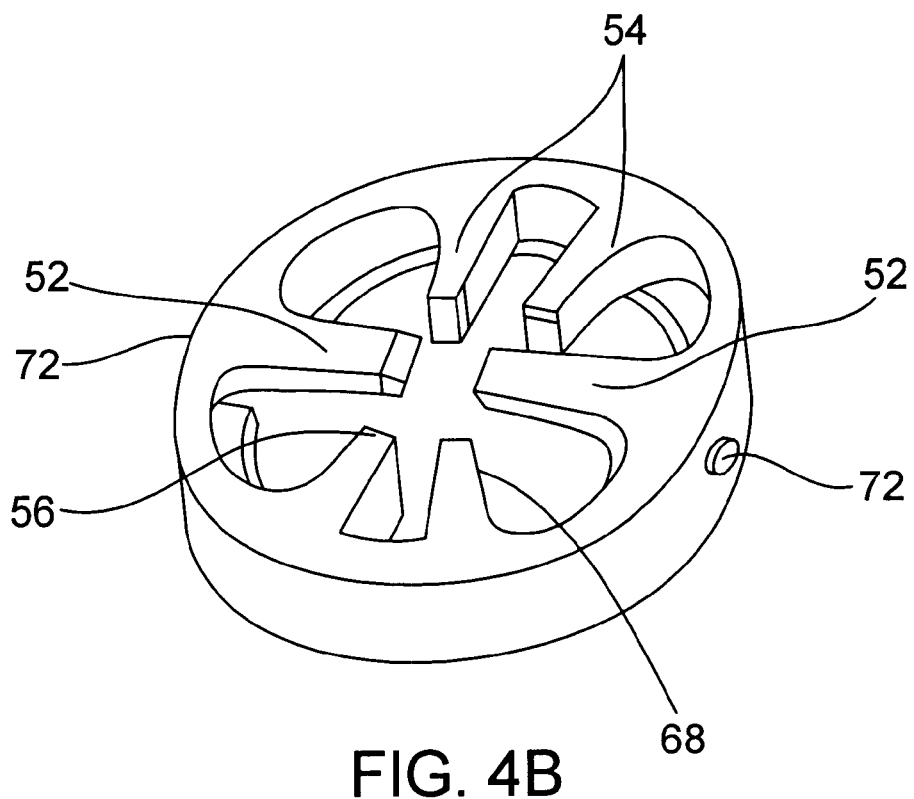

FIG. 3 shows details of the identification tag 12. As shown at "A" which is the top view of the identification tag 12, the tag includes certain features such as a latching means which in this particular figure is shown as tabs 30, a unique identification 40 such as the type that would be associated with, for example, a specific program such as a "FIND ME ID" program for special needs individuals, or it could also be associated with a child care provider, field trip, a school outing, scouts, boys/girls clubs, swimming pools, ski resorts and the like. In addition, the identification tag 12 includes some type of manipulator 32. The manipulator 32 is such that it allows for association with the wearer 20 through an association means. The underside of the identification tag 12 would include a detent 34 which would interact with a buckle 50 as shown in FIG. 4. The detent 34 might also be modified in a way so it includes a chamber 36. Within this chamber 36 could be included an individual identification tag 42 as well as other information such as contact information 46, micro film dots, medical information, microchips and the like.

Figure 5:
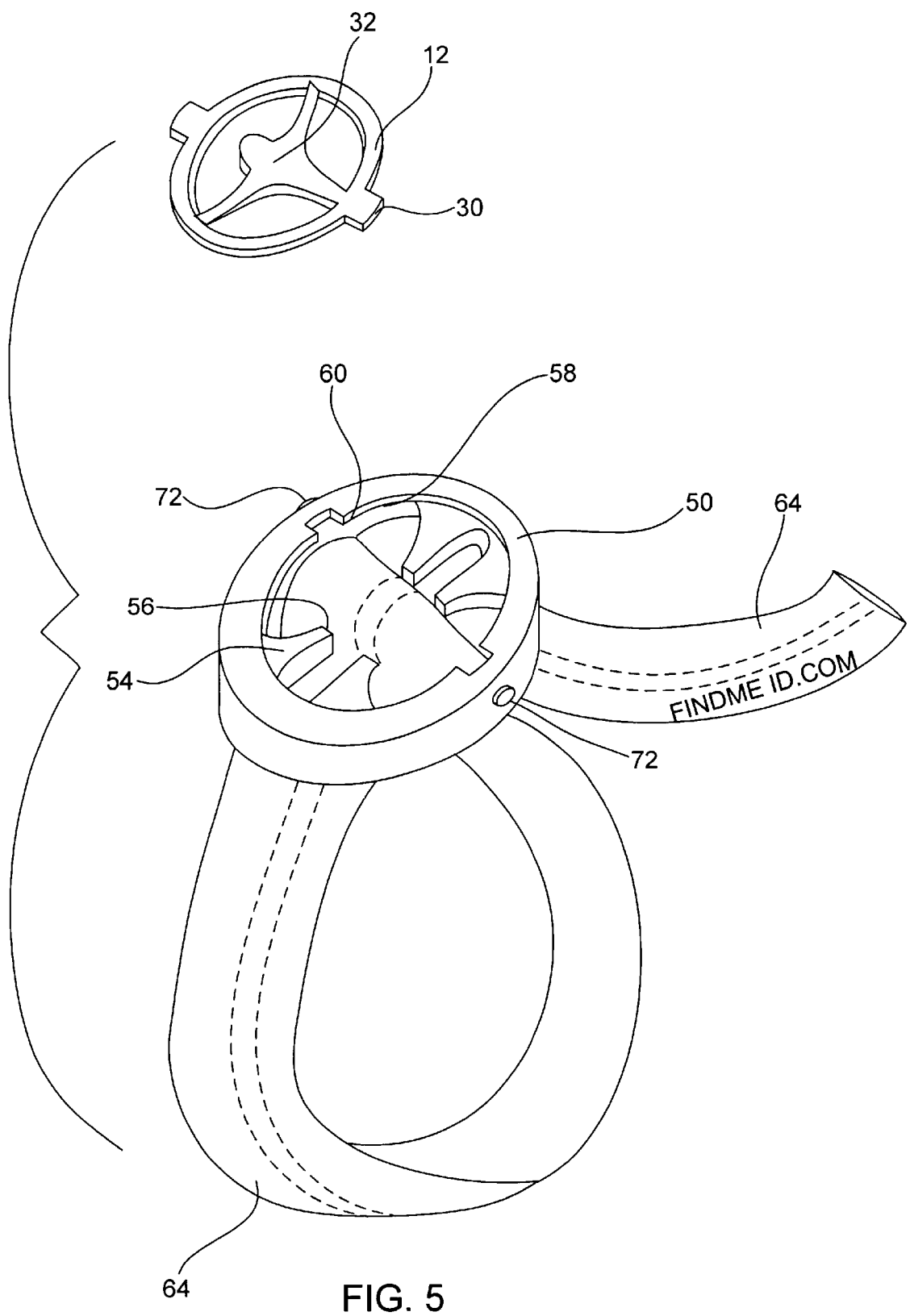
FIG. 5 isometric schematics of an identification tag and associating means, including a buckle and a loop as may be used in the identification system of FIG. 1.

Identification tag 12 is associated with the wearer 20 through an association means. FIG. 4 shows a buckle 50. The buckle 50 is of a design that interacts with the identification tag 12 depicted in FIG. 3 and a strap 64 as depicted in FIG. 5 to create the whole system. As shown in FIG. 4A, features of the buckle 50 include a cross-bar 52 and an upper flange 60. Within the body of buckle 50 and protected by the upper flange 60 are recesses 58 for accepting latching means or tabs 30 of identification tag 12 as depicted in FIG. 4A. Additional features of buckle 50 include support means 54 such as a wedge shape 56 with frictional ends 68 that can interact with strap 64 as shown in FIG. 5.

Buckle 50 is manufactured of a resilient material so as to maintain its substantially circular shape and yet be deformable when squeeze points 72 located at 3 o'clock and 9 o'clock are compressed such as might occur when squeeze points 72 are squeezed between an opposing index finger and thumb. This is particularly important when the identification tag 12 is engaged into the locking groove 58 and comes upon the first structural member 54 as it is being rotated in a clockwise or counterclockwise motion.

As identification tag 12 is rotated past structural member 54, it engages an area of restricted movability. One way of allowing for the identification tag to rotate to position tabs 30 at the 12 o'clock locked position is to apply force at squeeze points 72 which, in turn, bring the cross-bar 52 together and exaggerates the shape of the circle into an oval creating a greater diameter and allowing the tabs 30 to slip by. Once the tabs 30 have slipped, releasing the forces at the squeeze point 72 (3 o'clock and 9 o'clock positions), the resilient material reverts to its original circular shape and locks identification tag 12 within buckle 50. This same action causes detent 34 to engage onto the strap 64 to lock it and identification tag 12 in position.

Interestingly, this combination of buckle 50 and identification tag 12 make it wearer resistant in that two hands are needed to squeeze or compress the buckle 50 at squeeze points 72 and to rotate the identification tag 12 to lock it in place. The wearer 20 cannot accomplish this alone as the wearer 20 is limited to using one hand.

Moving to FIG. 5, we see the combination of the identification tag 12, the buckle 50 and the strap 64 as the attached end of strap 64 is engaged on cross-bar 52. As strap 64 is threaded through the torturous path between support means 54 and over cross-bar 52, the strap 64 passes above cross-bar 52 with its attached end strap. The strap can then engage the frictional ends 68 of the support means 54. In this way, the support means 54 and frictional ends 68 restrict the movement of strap 64 over cross-bar 52. Furthermore, the detent 34 of tag 12 serves to further restrict the movement of strap 64 over cross-bar 52. Also, strap 64 can be continuously adjusted to fit the identification tag wearer 20.

Various places that the identification tag 12 might be worn include the wrist, ankle, clothing, necklace, a belt loop, or the like depending on the manual dexterity of the wearer 20. The material of strap 64 might be of a type that is hydrophobic, hypoallergenic, a non-irritant and has a comfortable feel to the identification wearer 20. Such a material for strap 64 might include a synthetic polymer with added Teflon® material to enhance the comfort level to the identification wearer 20. Nylon-type materials may be suitable for strap 64. Incorporated within strap 64 might be a cut-resistant mechanism such as wire weaved within the strap 64 and additionally, for example, synthetic fiber such as Kevlar® and the like which would prevent one from cutting the strap from a wearer's arm.

In addition, the size and shape of both the identification tag 12 and the buckle 50 are such as to be non-hazardous to the wearer. This can be particularly important because a wearer may not appreciate the harm that could be caused by placing the tag in their mouth. In foresight that a wearer may accidentally swallow the identification tag 12 or the buckle 50, the identification tag 12 would be made of some type of material that is detectable through standard detection techniques such as x-ray. In this case, it would be desirable for the materials to be radio-opaque. The identification tag 12 might be made of a metallic material such as anodized aluminum and the like. Or, in the alternative, a synthetic material containing radio-opaque fillers may be chosen. In addition, buckle 50 and strap 64 may also have these features.

Another aspect of the identification system is that all of the components are safe when being worn or removed, contain a radio-opaque marker, are of a size that is not too large or cumbersome for identification tag wearer 20, are water resistant, non magnetic, non-corrosive, light weight, breathable, durable, and have a variety of compositions and flexibility in creating an aesthetic product.

The identification tag 12 may be upgradeable. For example, a pre-verbal child may use the system as a tag while older wearers might combine the system with a watch. When combined with a watch, the identification tag 12 and buckle 50 serve as both an identification means and as a locking buckle to prevent the wearer from removing the strap himself as two hands are required to manipulate the mechanism. This would be particularly important if the wearer was prone to wandering away such as is common with individuals with Alzheimer disease and the like.

Preferably, the system is water resistant so hydrophobic or water tolerant materials may be used. Other features of identification tag 12 include an adjustable strap 64, and no tools, keys or batteries are required for use. The tag is also fashionable, set up to be easily identifiable or brandable with a novel appearance, manufactured in a variety of colors with a simple and straightforward design, is light weight, difficult to remove by the wearer but intuitively removable by a caretaker without special skills or training, difficult to replicate for others and yet affordable for the masses with higher end models available.

With respect to the body of the identification tag 12, preferably it has a modular-type of design and would be intuitive for the guardian 24 to remove/open and yet difficult for identification tag wearer 20. The strap 64 would include other features including being brandable, hydrophobic, and composed of a breathable weave. In addition, the strap 64 is desirably non-fraying, cut resistant, has a good feel for the wearer, has a degree of elasticity as to prevent a tourniquet effect in case the strap 64 gets caught, is possibly anti microbial, durable, and comes in a variety of colors. In addition, strap 64 might be constructed of a tubular design which would permit access to space within strap 64 for placement of additional identification materials. These and other features would be apparent to those skilled in the art.

Figure 6A:
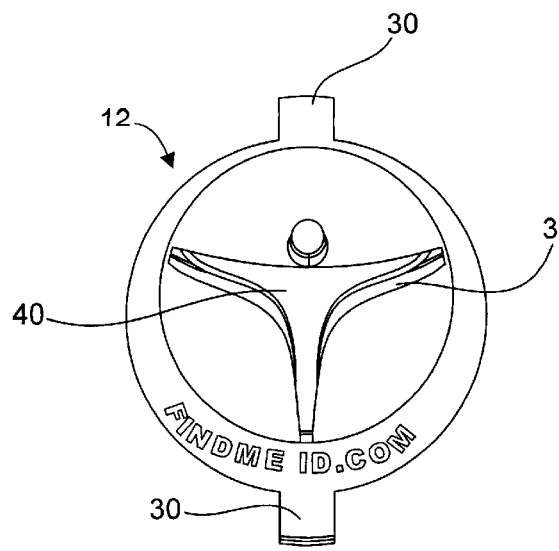
FIGS. 6A, 6B and 6C depict reasonable modifications of the identification tag depicted in FIGS. 3A and 3B and the means for associating the identification tag depicted in FIGS. 4A and 4B.
Figure 6B:
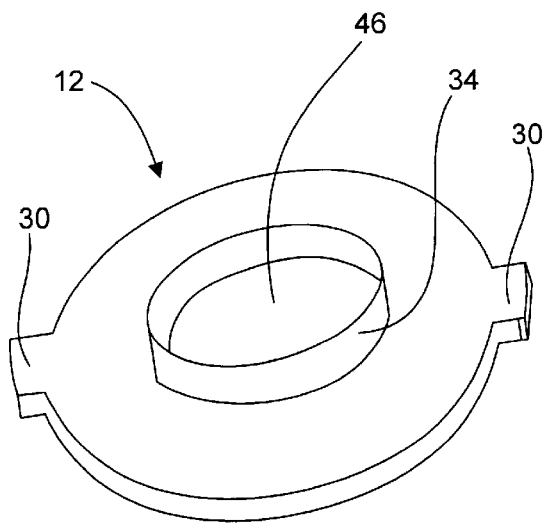

Certain modifications and improvements will occur to those skilled in the art upon a reading of the foregoing description. By way of example, as depicted in FIG. 6B, identification tag 12 might be modified to incorporate a large detent 34 and chamber 46 to contain future electronic components to permit tracking by global satellite positioning, digital cellular transmission or the like. Such a system could permit not only identification but also localization information and be incorporated with existing emergency systems such as the United States 911 system. The chamber 46 would be provided with a covering means to serve as protection for any chamber contents.

Figure 6C:
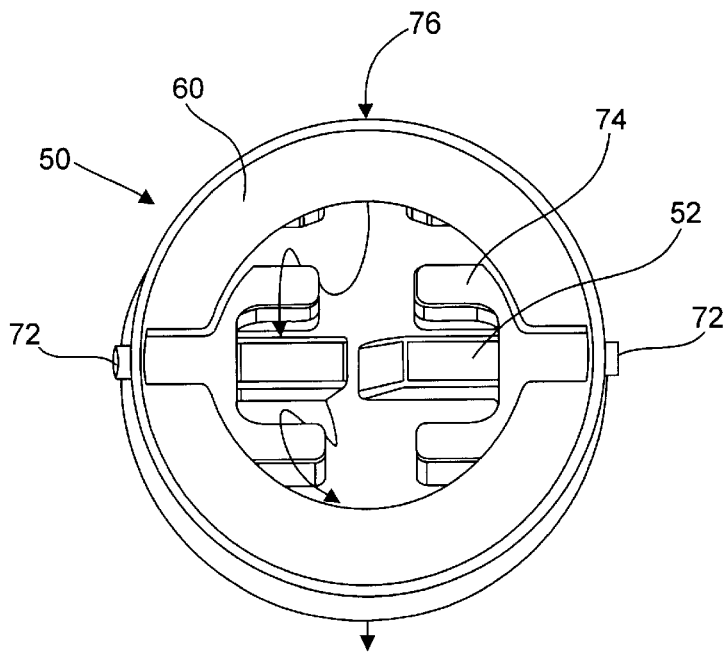

Another modification might include adding additional support means 74 to cross-bar 52. Such support means 74 might be Y-shaped or the like, and provide for threading the free end of the strap over one pair of support means 74, under cross-bar 52, and over the opposite support means 74 before exiting the buckle thus creating an opportunity to create a double-loop tortuous path 76 for the strap as depicted in FIG. 6C. Such a double-loop configuration would serve as great resistance to the wearer's strap if pulled in any direction. Alternatively, the design of support means 74 still permits the caretaker to use a single-loop tortuous path as depicted in the original design of buckle 50.

Furthermore, the addition of support means 74 permits more compression of the resilient material-composing buckle 50 at compression points 72 (at the 3 o'clock and 9 o'clock positions) which, in turn, permits the design of a wider upper flange 60. The upper flange 60 might serve to further protect the identification tag 12 from being removed from buckle 50 by means other than being turned, such as by being forcibly wedged out with a tool or the like.

Figure 7A:
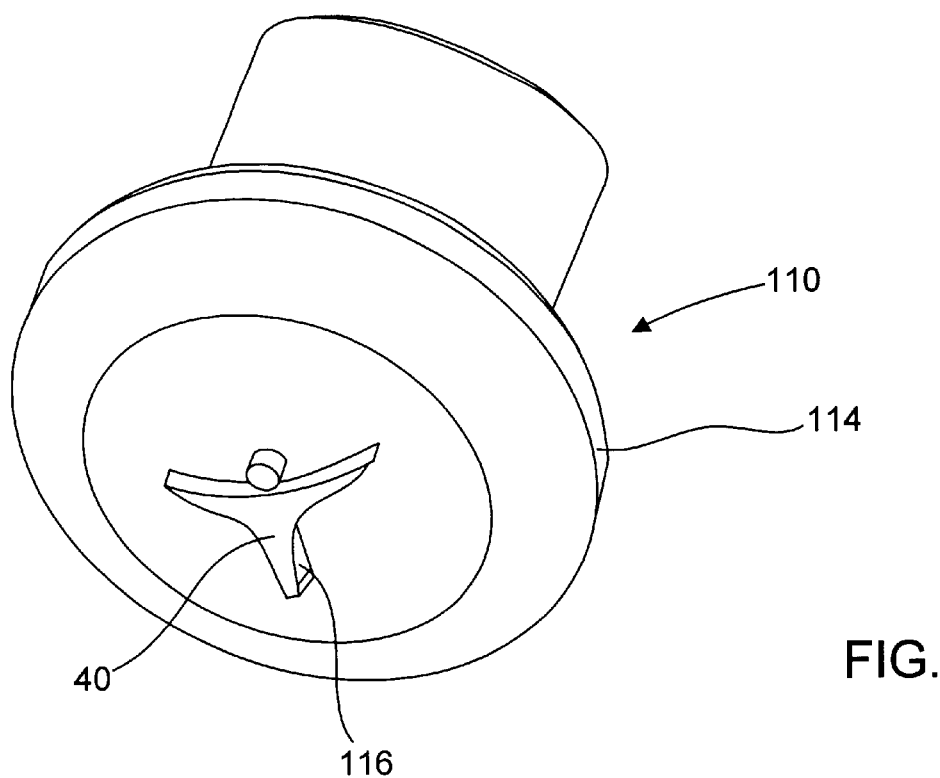
FIGS. 7A and 7B depict an association and removal means for associating the identification tag depicted in FIGS. 3A and 3B with the means for associating the identification tag depicted in FIGS. 4A and 4B.
Figure 7B:
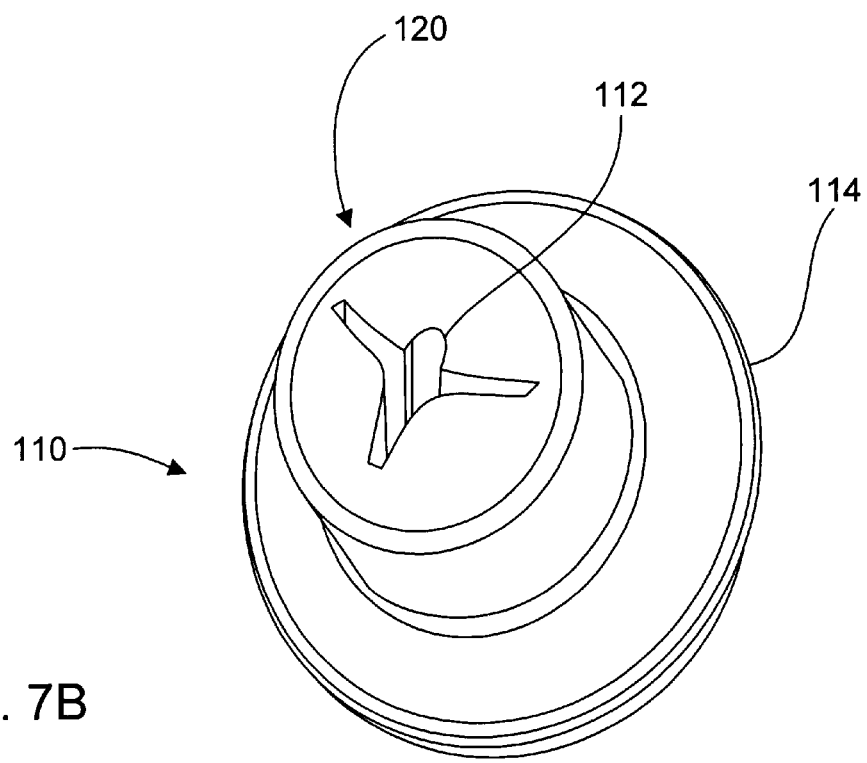

A further modification may be the addition to the system of a manipulator engagement tool 110 as depicted in FIGS. 7A and 7B. The manipulator engagement tool 110 may have a gripping structure 114 and an orienting structure 116. An appearance of orienting structure 116 may correspond to an appearance of manipulator 32 so as to assist with align, e.g., corresponding unique identification 40. In turn, the manipulator engagement tool 110 includes an engagement structure 120 which preferably includes a recess 112. Recess 112 may be associated with the unique identification 40 of the manipulator 32 of the identification tag 12, and once associated, facilitate the rotation of identification tag 12 by rotating manipulator engagement tool 110 and thus gaining mechanical advantage. Manipulator engagement tool 110 may facilitate those situations in which frequent placement and removal of identification tag 12 occur. However, manipulator engagement tool 110 would serve as a rotation facilitator. Identification tag 12 does not require any special tools for placement, removal or replacement.

It should be understood that all such modifications and improvements have been deleted herein for the sake of conciseness and readability but are properly within the scope of the following claims.

I claim:

1. A system of identification for persons having special needs, comprising:
    (a) an identification tag including a unique identifier for the wearer;
    (b) means for associating said tag with said wearer having special needs; and
    (c) a wearer resistant squeeze-and-turn buckle. whereby a two-handed application and removal design is employed, for associating said tag with said wearer having special needs.

2. The system of identification of claim 1, further including a computerized system for identifying persons having special needs.

3. The system of identification of claim 2, wherein said computerized system is Internet-based.

4. The system of identification of claim 3, wherein said Internet-based computerized system includes a plurality of communication types.

5. The system of identification of claim 4, further including means to restrict access to at least one of said plurality of communication types.

6. The system of identification of claim of claim 5, wherein said means to restrict access restricts access to a governmental agency.

7. The system of identification of claim 6, wherein said governmental agency access includes access to extended information.

8. The system of identification of claim 7, wherein said extended information is contact information for said person with special needs.

9. The system of identification of claim 7, wherein said extended information is personal information of said person with special needs.

10. The system of identification of claim 7, wherein said extended information is medical information about said person with special needs.

11. The system of identification of claim 5, wherein said means to restrict access restricts access to a finder of said person with special needs.

12. The system of identification of claim 11, wherein said finder access includes access to limited contact information.

13. The system of identification of claim 5, wherein said means to restrict access to at least one of said plurality of communication types includes unique access codes.

14. The system of identification of claim 13, wherein said unique access codes are geographical.

15. The system of identification of claim 13, wherein said unique access codes are regional.

16. The system of identification of claim 4, further including a human interface.

17. The system of identification of claim 16, wherein said human interface is continuously accessible.

18. The system of identification of claim 3, further including technical assistance.

19. The system of identification of claim 3, further including sales and replacement.

20. The system of identification of claim 3, further including links to other organizations.

21. The system of identification of claim 20, wherein said links to other organizations are selected from the list consisting of agencies, governmental authorities, schools and hospitals.

22. The system of identification of claim 3, wherein said Internet-based computerized system is continuously accessible.

23. The system of identification of claim 22, wherein said internet-based computerized system is accessible by electronic mail.

24. The system of identification of claim 3, wherein said internet-based computerized system is continually upgradeable.

25. The system of identification of claim 24, wherein said internet-based computerized system is continuously upgradeable by individual subscribers.

26. The system of identification of claim 24, wherein said continuously upgradeable computerized system is customizable by individual subscribers.

27. The system of identification of claim 1, wherein said identification tag is non-hazardous to said wearer.

28. The system of identification of claim 27, wherein said identification tag is non-hazardous when worn.

29. The system of identification of claim 27, wherein said identification tag is non-hazardous when removed from wearer.

30. The system of identification of claim 29, wherein said identification tag is so-dimensioned that a person having special needs cannot swallow said identification tag.

31. The system of identification of claim 29, wherein said identification tag is non-conductive when removed from said system of identification.

32. The system of identification of claim 1, wherein said identification tag is locatable.

33. The system of identification of claim 32, wherein said identification tag is radio-opaque.

34. The system of identification of claim 1, wherein said identification tag further includes a latching means.

35. The system of identification of claim 34, wherein said latching means includes tabs.

36. The system of identification of claim 34, further including a manipulator.

37. The system of identification of claim 36, wherein said manipulator includes a round portion.

38. The system of identification of claim 36, where in s aid manipulator includes a recessed portion.

39. The system of identification of claim 1, wherein said identification tag further includes a detent.

40. The system of identification of claim 39, wherein said detent further includes a chamber.

41. The system of identification of claim 40, wherein said chamber further includes a unique identification.

42. The system of identification of claim 40, wherein said chamber further includes contact information.

43. The system of identification of claim 1, wherein said identification further includes identification unique to a plurality of wearers.

44. The system of identification of claim 43, wherein said unique, identification is brandable.

45. The system of identification of claim 44, wherein said brandable identification includes colors.

46. The system of identification of claim 44, wherein said brandable identification includes a logo.

47. The system of identification of claim 44, wherein said brandable identification includes an emblem.

48. The system of identification of claim 1, wherein said identification tag includes individual identification.

49. A system of identification for persons having special needs, said system including an identification tag having a unique identifier for a wearer and a means for associating said tag with said wearer having special needs, said means for associating said tag comprising: a wearer resistant squeeze-and-turn buckle, whereby a two-handed application and removal design is employed, for associating said tag with said wearer having special needs.

50. The system of identification of claim 49, wherein said squeeze-and-turn buckle is a substantially cylindrical body includes:
    (a) a cross-bar;
    (b) an upper flange; and
    (c) support means.

51. The system of identification of claim 50, wherein said cross-bar has opposed flanges.

52. The system of identification of claim 51, wherein said opposed flanges are beveled and interlocking.

53. The system of identification of claim 51, wherein said opposed flanges are overlapping.

54. The system of identification of claim 53, wherein said opposed flanges further include strap guides.

55. The system of identification of claim 54, wherein said strap guides are up to about 18 mm.

56. The system of identification of claim 50, wherein said upper flange has a locking groove.

57. The system of identification of claim 56, wherein said locking groove includes tab guides.

58. The system of identification of claim 56, wherein said locking groove is omni-directional.

59. The system of identification of claim 50, wherein said upper flange is substantially peripheral.

60. The system of identification of claim 50, wherein said support means further include a plurality of wedges.

61. The system of identification of claim 60, wherein said plurality of wedges comprises opposed pairs of wedges.

62. The system of identification of claim 60, wherein said plurality of wedges further include frictional ends.

63. The system of identification of claim 50, wherein said substantially cylindrical body is resilient.

64. The system of identification of claim 49, wherein said squeeze-and-turn buckle further includes a strap.

65. The system of identification of claim 64, wherein said strap is continuously adjustable.

66. The system of identification of claim 64, wherein said strap is cut-resistant.

67. The system of identification of claim 64, wherein said strap is hydrophobic.

68. The system of identification of claim 64, wherein said strap is flexible.

69. The system of identification of claim 64, wherein said strap is brandable.

70. The system of identification of claim 64, further including indicia formed on said strap.

71. The system of identification of claim 64, wherein said strap further includes a loop.

72. The system of identification of claim 49, further including a manipulator engagement tool.

73. The system of identification of claim 72, wherein said manipulator engagement tool includes an engagement structure.

74. The system of identification of claim 73, wherein said engagement structure is a recess.

75. The system of identification of claim 72, wherein said manipulator engagement tool includes a gripping structure.

76. The system of identification of claim 72, wherein said manipulator engagement tool includes an orientation structure.

77. A system of identification for persons having special needs, comprising:
    (a) an identification tag including a unique identifier for the wearer;
    (b) a wearer resistant squeeze-and-turn buckle, whereby a two-handed application and removal design is employed, for associating said tag with said wearer having special needs; and
    (c) a computerized system for identifying persons having special needs.

78. The system of identification of claim 77, wherein said computerized system is Internet-based.

79. The system of identification of claim 78, wherein said Internet-based computerized system includes a plurality of communication types.

80. The system of identification of claim 79, further including means to restrict access to at least one of said plurality of communication types.

81. The system of identification of claim of claim 80, wherein said means to restrict access restricts access to a governmental agency.

82. The system of identification of claim 81, wherein said governmental agency access includes access to extended information.

83. The system of identification of claim 82, wherein said extended information is contact information for said person with special needs.

84. The system of identification of claim 82, wherein said extended information is personal information of said person with special needs.

85. The system of identification of claim 82, wherein said extended information is medical information about said person with special needs.

86. The system of identification of claim 80, wherein said means to restrict access restricts access to a finder of said person with special needs.

87. The system of identification of claim 86, wherein said finder access includes access to limited contact information.

88. The system of identification of claim 80, wherein said means to restrict access to at least one of said plurality of communication types includes unique access codes.

89. The system of identification of claim 88, wherein said unique access codes are geographical.

90. The system of identification of claim 88, wherein said unique access codes are regional.

91. The system of identification of claim 79, further including a human interface.

92. The system of identification of claim 91, wherein said human interface is continuously accessible.

93. The system of identification of claim 78, further including technical assistance.

94. The system of identification of claim 78, further including sales and replacement.

95. The system of identification of claim 78, further including links to other organizations.

96. The system of identification of claim 95, wherein said links to other organizations are selected from the list consisting of agencies, governmental authorities, schools and hospitals.

97. The system of identification of claim 78, wherein said Internet-based computerized system is continuously accessible.

98. The system of identification of claim 97, wherein said internet-based computerized system is accessible by electronic mail.

99. The system of identification of claim 78, wherein said internet-based computerized system is continually upgradeable.

100. The system of identification of claim 99, wherein said internet-based computerized system is continuously upgradeable by individual subscribers.

101. The system of identification of claim 99, wherein said continuously upgradeable computerized system is customizable by individual subscribers.

102. The system of identification of claim 77, wherein said identification tag is non-hazardous to said wearer.

103. The system of identification of claim 102, wherein said identification tag is non-hazardous when worn.

104. The system of identification of claim 102, wherein said identification tag is non-hazardous when removed from wearer.

105. The system of identification of claim 104, wherein said identification tag is so-dimensioned that a person having special needs cannot swallow said identification tag.

106. The system of identification of claim 104, wherein said identification tag is non-conductive when removed from said system of identification.

107. The system of identification of claim 77, wherein said identification tag is locatable.

108. The system of identification of claim 107, wherein said identification tag is radio-opaque.

109. The system of identification of claim 77, wherein said identification tag further includes a latching means.

110. The system of identification of claim 109, wherein said latching means includes tabs.

111. The system of identification of claim 109, further including a manipulator.

112. The system of identification of claim 111, wherein said manipulator includes a round portion.

113. The system of identification of claim 111, wherein said manipulator includes a recessed portion.

114. The system of identification of claim 77, wherein said identification tag further includes a detent.

115. The system of identification of claim 114, wherein said detent further includes a chamber.

116. The system of identification of claim 115, wherein said chamber further includes a unique identification.

117. The system of identification of claim 115, wherein said chamber further includes contact information.

118. The system of identification of claim 77, wherein said identification further includes identification unique to a plurality of wearers.

119. The system of identification of claim 118, wherein said unique identification is brandable.

120. The system of identification of claim 119, wherein said brandable identification includes colors.

121. The system of identification of claim 119, wherein said brandable identification includes a logo.

122. The system of identification of claim 119, wherein said brandable identification includes an emblem.

123. The system of identification of claim 77, wherein said identification tag includes individual identification.

124. The system of identification of claim 77, wherein said squeeze-and-turn buckle is a substantially cylindrical body includes:

(a) a cross-bar;

(b) an upper flange; and (c) support means.

125. The system of identification of claim 124, wherein said cross-bar has opposed flanges.

126. The system of identification of claim 125, wherein said opposed flanges are beveled and interlocking.

127. The system of identification of claim 125, wherein said opposed flanges are overlapping.

128. The system of identification of claim 127, wherein said opposed flanges further include strap guides.

129. The system of identification of claim 128, wherein said strap guides are up to about 18 mm.

130. The system of identification of claim 124, wherein said upper flange has a locking groove.

131. The system of identification of claim 130, wherein said locking groove includes tab guides.

132. The system of identification of claim 130, wherein said locking groove is omni-directional.

133. The system of identification of claim 124, wherein said upper flange is substantially peripheral.

134. The system of identification of claim 124, wherein said support means further include a plurality of wedges.

135. The system of identification of claim 134, wherein said plurality of wedges comprises opposed pairs of wedges.

136. The system of identification of claim 134, wherein said plurality of wedges further include frictional ends.

137. The system of identification of claim 124, wherein said substantially cylindrical body is resilient.

138. The system of identification of claim 77, wherein said squeeze-and-turn buckle further includes a strap.

139. The system of identification of claim 138, wherein said strap is continuously adjustable.

140. The system of identification of claim 138, wherein said strap is cut-resistant.

141. The system of identification of claim 138, wherein said strap is hydrophobic.

142. The system of identification of claim 138, wherein said strap is flexible.

143. The system of identification of claim 138, wherein said strap is brandable.

144. The system of identification of claim 138, further including indicia formed on said strap.

145. The system of identification of claim 138, wherein said strap further includes a loop.

146. The system of identification of claim 77, further including a manipulator engagement tool.

147. The system of identification of claim 146, wherein said manipulator engagement tool includes an engagement structure.

148. The system of identification of claim 147, wherein said engagement structure is a recess.

149. The system of identification of claim 146, wherein said manipulator engagement tool includes an orientation structure.

150. The system of identification of claim 146, wherein said manipulator engagement tool includes an orientation structure.

\* \* \* \* \*

UNITED STATES PATENT AND TRADEMARK OFFICE
CERTIFICATE OF CORRECTION

PATENT NO. : 6,510,988 B1  
DATED : January 28, 2003  
INVENTOR(S) : Eric M. Kraus It is certified that error appears in the above-identified patent and that said Letters Patent is hereby corrected as shown below:

Column 9,  
Line 38, paragraph (c) after the word "buckle", the period should be a comma.  
Line 41, paragraph (c) after the last word "needs", the following should be added:  
-- ,wherein said wearer cannot accomplish this alone as said wearer is limited using one hand. --

Column 11,  
Lines 22-29, Claim 49 should read:  
A system for identification for persons having special needs, said system including an identification tag having a unique identifier for a wearer and a means for associating said tag with said wearer having special needs, said means for associating said tag comprising: a wearer resistant squeeze-and-turn buckle, whereby a two-handed application and removal design is employed, wherein said wearer cannot accomplish this alone as said wearer is limited to using one hang for associating said tag with said wearer having special needs.

Column 12,  
Lines 23-32, Claim 77 should read:  
A system for identification for persons having special needs, comprising:
  (a) an identification tag including a unique identifier for the wearer;
  (b) a wearer resistant squeeze-and-turn buckle, whereby a two-handed application and removal design is employed, for associating said tag with said wearer having special needs, wherein said wearer cannot accomplish this alone as said wearer is limited to using one hand; and
  (c) a computerized system for identifying persons having special needs.

Signed and Sealed this

Fifteenth Day of July, 2003

JAMES E. ROGAN  
*Director of the United States Patent and Trademark Office*